United States Patent
Zhou et al.

(10) Patent No.: US 11,748,919 B2
(45) Date of Patent: Sep. 5, 2023

(54) METHOD OF IMAGE RECONSTRUCTION FOR CROSS-MODAL COMMUNICATION SYSTEM AND DEVICE THEREOF

(71) Applicant: NANJING UNIVERSITY OF POSTS AND TELECOMMUNICATIONS, Nanjing (CN)

(72) Inventors: Liang Zhou, Nanjing (CN); Xin Wei, Nanjing (CN); Meng Zhang, Nanjing (CN); Jianxin Chen, Nanjing (CN); Zihan Gao, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/002,500

(22) PCT Filed: Jul. 1, 2022

(86) PCT No.: PCT/CN2022/103303
§ 371 (c)(1),
(2) Date: Dec. 20, 2022

(87) PCT Pub. No.: WO2023/280065
PCT Pub. Date: Jan. 12, 2023

(65) Prior Publication Data
US 2023/0196633 A1  Jun. 22, 2023

(30) Foreign Application Priority Data
Jul. 9, 2021 (CN) .......................... 202110776726.4

(51) Int. Cl.
*G06T 11/00* (2006.01)
*G08B 6/00* (2006.01)
(Continued)

(52) U.S. Cl.
CPC .............. *G06T 11/00* (2013.01); *G06N 3/045* (2023.01); *G06N 3/048* (2023.01); *G06N 3/0464* (2023.01); *G06N 3/094* (2023.01); *G08B 6/00* (2013.01)

(58) Field of Classification Search
CPC ........ G06T 11/00; G06N 3/094; G06N 3/048; G06N 3/045; G06N 3/0464; G08B 6/00
See application file for complete search history.

(56) References Cited

U.S. PATENT DOCUMENTS

| 9,880,623 B2 * | 1/2018 | Lacroix ................... G06F 3/016 |
| 2018/0165926 A1 * | 6/2018 | Wu .......................... G06T 7/269 |

(Continued)

FOREIGN PATENT DOCUMENTS

| CN | 112905822 A | 6/2021 |
| CN | 112949707 A | 6/2021 |
| CN | 113628294 A | 11/2021 |

OTHER PUBLICATIONS

Written opinion of the International Searching Authority issued in International application No. PCT/CN2022/103303; National Intellectual Property Administration, Beijing City, China, dated Sep. 29, 2022; 10 pgs.

(Continued)

*Primary Examiner* — Xilin Guo
(74) *Attorney, Agent, or Firm* — Hauptman Ham, LLP

(57) ABSTRACT

A method of image reconstruction for a cross-modal communication system is disclosed. The method reconstructs a damaged, lost, or delayed image signal during transmission by using complete haptic signals received by a receiving end in the cross-modal communication system, and further constructs a cross-modal interaction network with reference to an attention mechanism, thus solving the limitation of the conventional generation model that it can only be trained on paired samples. An image reconstruction device for a cross- (Continued)

modal communication system is also disclosed. By fully utilizing semantic correlation between different-modality data and realizing cross-modal generation from haptic signals to image signals for unpaired data, the present invention overcomes the difficulty in acquiring haptic-image signal pairs in the practical cross-modal communication system, and significantly improves the quality and class accuracy of generated image signals.

10 Claims, 3 Drawing Sheets

(51) Int. Cl.
*G06N 3/094* (2023.01)
*G06N 3/045* (2023.01)
*G06N 3/048* (2023.01)
*G06N 3/0464* (2023.01)

(56) References Cited

U.S. PATENT DOCUMENTS

| | | |
|---|---|---|
| 2018/0285695 A1 | 10/2018 | Guo et al. |
| 2021/0303921 A1* | 9/2021 | Niu ....................... G06V 30/274 |
| 2022/0300585 A1* | 9/2022 | Mudumba ............... G06F 21/57 |
| 2023/0041294 A1* | 2/2023 | Tokubo ................... G06F 3/011 |

OTHER PUBLICATIONS

International Search Report issued in International application No. PCT/CN2022/103303; National Intellectual Property Administration, Beijing City, China, dated Sep. 29, 2022; 5 pgs.

Gao Yun, et al.; Preliminary Study of Theory and Key Technology of Cross-Modal Communications; Journal of Communication University of China (Science and Technology); vol. 28, No. 1, Feb. 20, 2021, 9 pgs.

* cited by examiner

METHOD OF IMAGE RECONSTRUCTION FOR CROSS-MODAL COMMUNICATION SYSTEM AND DEVICE THEREOF

RELATED APPLICATIONS

The present application is a U.S. National Phase of International Application Number PCT/CN2022/103303, filed Jul. 1, 2022, and claims priority to Chinese Application Number 202110776726.4, filed Jul. 9, 2021.

TECHNICAL FIELD

The present invention relates to the field of cross-modal image generation, and in particular, to a method of image reconstruction for a cross-modal communication system and a device thereof.

BACKGROUND

Cross-modal communication is a novel communication technology targeted at coordinated transmission and joint processing of image, audio, and haptic signals, which supports multi-modal services, which has features such as multi-dimensional integration and immersive sensory experience provision. However, in the process of cross-modal communication, there are often problems such as a limited transmission capacity and transmission interference, resulting in blurred or even complete loss of image signal received by a terminal.

In view of various interference factors in the transmission process, relevant scholars have proposed a series of image reconstruction methods. For example, in order to eliminate impulse noise in image restoration, a total-variation-based sparse optimization method is proposed; and in order to avoid packet loss during transmission, information about optical flow algorithms and adjacent available frames are used for reconstruction. These image reconstruction methods are implemented mainly by virtue of other complete images or video frames within the image modality. However, in multi-modal applications, multi-modal streams coexist and compete with one another, which may result in severe damage or loss of video streams during transmission. Therefore, these methods are inapplicable to cross-modal communication.

In the cross-modal communication, image and haptic signals coexist, and the content to be transmitted has intrinsic semantic coherence among these two modalities. Moreover, during transmission, haptic signals usually given a higher priority than image signals, and the haptic signals received at the receiving end has better integrity. Therefore, damaged, lost or delayed image signals may be generated by using the haptic signals and intrinsic semantic information, that is, haptic-to-image cross-modal generation is performed for image reconstruction.

In recent years, cross-modal signal processing technique has also become a hot research topic, where the idea is to mine the semantics between forms such as text, sound, and video to carry out retrieval, reconstruction, and other tasks. However, these methods require paired data as a training set. They are not suitable for those application scenarios where it is difficult to acquire paired data. Therefore, designing better methods is a challenge needing to be tackled.

SUMMARY

The technical problem to be solved by the present invention is to provide an image reconstruction method and device for a cross-modal communication system, so as to overcome the shortcomings in the prior art. This technology can fulfill a haptic-to-image cross-modal generation task for unpaired data.

The present invention adopts the following technical solutions to solve the foregoing technical problem:

The present invention provides an image reconstruction method for a cross-modal communication system, which includes the following steps:

step 1. selecting haptic signal and image data pairs received by a receiving end of a cross-modal communication system to serve as a training set, where the image data in each hapic signal and image data pair in the training set has label information about the class it belongs to;

step 2. establishing a cross-modal image generation model based on haptic signals, the model including an image feature extraction module, an attention mechanism-based cross-modal semantic learning module, and an adversarial image generation module, where the image feature extraction module includes a convolutional neural network (CNN) and a first-class adversarial network, and is used for performing feature extraction for the image data in the training set to obtain an image feature;

the cross-modal semantic learning module includes an encoder, an attention mechanism-based semantic fusion network, and a second-class adversarial network, where the encoder performs feature extraction for the haptic signals in the training set to obtain the corresponding haptic features; then, the haptic features and the image features are together input to the attention mechanism-based semantic fusion network, and the network performs similarity calculation between haptic features having the same label as the image feature; then, a sigmoid function operation is further performed to obtain weight vectors of the haptic features corresponding to the current image feature; then, weighted summation is performed for the haptic features based on the weight vectors to obtain a synthetic haptic feature most similar to the current image feature; and afterwards, the second-class adversarial network strengthens the synthetic haptic feature under the effect of adversarial learning, to maintain class and distribution characteristics of the haptic signal;

the adversarial image generation module includes a generative adversarial network, and is used for outputting a generated image having the same label as the strengthened synthetic haptic feature after receiving the synthetic haptic feature;

step 3. training the cross-modal image generation model based on haptic signals, wherein an intra-modal loss of the image features is calculated according to the image feature extraction module, an intra-modal loss of the synthetic haptic feature and an inter-modal loss between the synthetic haptic feature and the image features is calculated according to the attention mechanism-based cross-modal semantic learning module, and an adversarial generation loss of the generated image is calculated according to the adversarial image generation module and by means of mean square error; these calculated losses are used for updating parameters in the cross-modal image generation model; and after the training converges, an optimal cross-modal image generation model and parameters at this time are saved; and step 4. after completion of the training, inputting the haptic signal received by the receiving end of the cross-modal communication system to the trained cross-modal image generation model to output a target image.

As a further optimization solution to the image reconstruction method for a cross-modal communication system of the present invention, feature extraction for the image data in step 2 includes the following steps:

(2-1) subjecting image data V to processing by the CNN to obtain an image feature $v'^{(f)}$, where the CNN includes a plurality of convolutional layers and a pooling layer is connected after each convolutional layer;

(2-2) constructing a first-class adversarial network for $v'^{(f)}$, wherein the first-class adversarial network includes a class label predictor $f_v(\cdot)$ with a network parameter $\theta_v$ and a class label discriminator $D_1$ with a network parameter $\alpha$, where $f_v(\cdot)$ consists of a plurality of fully connected layers and one softmax layer, and an input of $f_v(\cdot)$ is the image feature $v'^{(f)}$ and an output of $f_v(\cdot)$ is a predicted class label $v^{(c)}=f_v(v'^{(f)}; \theta_v)$; the class label discriminator $D_1$ consists of a plurality of fully connected layers that are sucessively connected and the dimension of the last layer is 1; and $D_1$ is used for discriminating $v^{(c)}$ and a true label $y_v$ corresponding to the image feature $v'^{(f)}$; and by means of adversarial training by $f_v(\cdot)$ and $D_1$, $v'^{(f)}$ is updated constantly, and an image feature $v^{(f)} = \{v_i^{(f)}, i=1, 2, \ldots, N\}$ that has class characteristic is finally extracted, where $v_i^{(f)}$ is an image feature of the i-th image data and N is a total image data amount.

As a further optimization solution to the image reconstruction method for a cross-modal communication system of the present invention, an adversarial loss of the first-class adversarial network is as follows:

$$L_{cat}^V(D_1) = -E_{y_v}[\log D_1(y_v;\alpha)] - E_{v^{(c)}}[\log(1-D_1(v^{(c)};\alpha))]$$

$$L_{cat}^V(v^{(c)}) = -E_{v^{(c)}}[\log(1-D_1(v^{(c)};\alpha))]$$

where $L_{cat}^V(D_1)$ is an adversarial loss function for the class label discriminator $D_1$; $E_{y_v}[*]$ and $E_{v^{(c)}}[*]$ refer to calculation of an expectation for *; $D_1(y_v; \alpha)$ indicates a discrimination result of the class label discriminator for a true label $y_v$; $D_1(v^{(c)}; \alpha)$ indicates a discrimination result of the class label discriminator for $v^{(c)}$ output by the class label predictor; and $L_{cat}^F(v^{(c)})$ is an adversarial loss function for the class label predictor $f_v(\cdot)$.

As a further optimization solution to the image reconstruction method for a cross-modal communication system of the present invention, a learning process of the attention mechanism-based cross-modal semantic learning module in step 2 is specifically as follows:

(3-1) subjecting a haptic signal to processing by the encoder to obtain a haptic feature $h^{(f)} = \{h_j^{(f)}, j=1,2,\ldots,N\}$, where $h_j^{(f)}$ is a haptic feature of the j-th haptic signal, N is a total data amount of haptic signals, and the encoder includes a gated recurrent unit (GRU) and a plurality of fully connected layers;

(3-2) matching, by the attention mechanism-based semantic fusion network, the haptic feature and $v^{(f)}$ extracted in step (2-2), where with each $v_i^{(f)}$ as a query vector, a synthetic haptic feature $\tilde{h}_i^{(f)}$ belonging to the same class as $v_i^{(f)}$ is screened out, where $\tilde{h}_i^{(f)}$ and $v_i^{(f)}$ form a haptic-image feature pair, and then a synthetic haptic feature corresponding to $v^{(f)}$ is $\tilde{h}^{(f)} = \{\tilde{h}_i^{(f)}, i=1,2,\ldots,N\}$, which is specifically as follows:

3-2-1. inputting $v_i^{(f)}$ and the haptic feature $h^{(f)}$ to the attention mechanism-based semantic fusion network to output a haptic hidden layer representation vector $h^{(r)} = \{h_j^{(r)}, j=1, 2, \ldots, N\}$, where $h_j^{(r)}$ is a hidden layer representation vector of the j-th haptic feature $h_j^{(f)}$, the hidden layer is a single-layer perceptron structure, and an activation function is the Tanh( ) function; and a specific process is as follows:

$$h_j^{(r)} = \text{Tanh}(wh_j^{(j)} + b)$$

where w and b are network parameters of the hidden layer in the attention mechanism-based semantic fusion network;

3-2-2. calculating the Pearson correlation coefficient regarding $h_j^{(r)}$ and $v_i^{(f)}$ as the similarity:

$$\text{Sim}_{i,j} = I_{i,j} \frac{h_j^{(r)} \cdot v_i^{(f)} - \|h_j^{(r)}\|_1 \cdot \|v_i^{(f)}\|_1}{\sqrt{\|(h_j^{(r)})^2\|_1 - \|h_j^{(r)}\|_1^2} \sqrt{\|(v_i^{(f)})^2\|_1 - \|v_i^{(f)}\|_1^2}}$$

$$I_{i,j} = \begin{cases} 1, & y_{h_j^{(r)}} = y_{v_i^{(f)}} \\ 0, & y_{h_j^{(r)}} \neq y_{v_i^{(f)}} \end{cases}$$

where $\text{Sim}_{i,j}$ is the similarity between $v_i^{(f)}$ and $h_j^{(r)}$; $y_{h_j^{(r)}}$, and are class labels of $h_j^{(r)}$ and $v_i^{(f)}$ respectively; $\|\cdot\|_1$ is the L1 norm; $I_{i,j}$ is a scoring function which is used for reducing redundant search and calculation for the haptic feature; and selecting haptic features having the same class label as $v_i^{(f)}$ as candidate haptic features that participate in the calculation of the similarity $\text{Sim}_{i,j}$;

3-2-3. performing normalization processing for the similarity $\text{Sim}_{i,j}$ by using the softmax( ) function to obtain an attention weight factor $a_{i,j}$; and then performing weighted summation for the candidate haptic features to obtain a synthetic haptic feature $\tilde{h}_i^{(f)}$ having the same class as $v_i^{(f)}$:

$$a_{i,j} = \text{softmax}(\text{Sim}_{i,j})$$

$$\tilde{h}_i^{(f)} = \sum_{j=1}^{N} a_{i,j} \cdot h_j^{(f)}$$

(3-3) constraining the image feature and the haptic feature by means of semantic information between paired modalities: specifically, an inter-modal loss objective function is calculated for all the image features and haptic features:

$$L_{cro} = \sum_{i=1}^{N} \|\tilde{h}_i^{(f)} - v_i^{(f)}\|_2^2 + \sum_{i \neq j} \max\left(\delta - \|\tilde{h}_j^{(f)} - v_i^{(f)}\|_2^2, 0\right)^2$$

where $L_{cro}$ is an inter-modal loss between the image feature and the haptic feature; $\tilde{h}_j^{(f)}$ is the j-th synthetic haptic feature unpaired with $v_i^{(f)}$, $\delta$ is a threshold for limiting the difference between $\tilde{h}_j^{(f)}$ and $v_i^{(f)}$; and $\|\cdot\|_2$ is the L2 norm;

(3-4) constructing a second-class adversarial network for $\tilde{h}^{(f)}$, where the second-class adversarial network includes a class label predictor $f_h(\cdot)$ with a network parameter $\theta_h$ and a class label discriminator $D_2$ with a network parameter $\beta$; the class label predictor $f_h(\cdot)$ has a plurality of fully connected layers and one softmax layer, and an input is $\tilde{h}^{(f)}$ and an output is a predicted class label $\tilde{h}^{(c)} = f^h(\tilde{h}^{(f)}; \theta_h)$ of $\tilde{h}^{(f)}$; the class label discriminator $D_2$ consists of a plurality of fully connected layers that are sucessively connected and the dimension of the last layer is 1; and $D_2$ is used for discriminating the authenticity of $\tilde{h}^{(c)}$ and the true label $y_h$ corresponding to $\tilde{h}^{(f)}$; by means of adversarial training by the class label predictor $f_h(\cdot)$ and the class label discriminator $D_2$, $\tilde{h}^{(f)}$ is updated constantly, such that the synthetic haptic feature finally has a class feature.

As a further optimization solution to the image reconstruction method for a cross-modal communication system of the present invention, an adversarial loss of the second-class adversarial network is as follows:

$$L_{cat}^H(D_2) = -E_{y_k}[\log D_2(y_h;\beta)] - E_{\tilde{h}^{(c)}}[\log(1-D_2(\tilde{h}^{(c)};\beta))]$$

$$L_{cat}^H(\tilde{h}^{(c)}) = -E_{\tilde{h}^{(c)}}[\log(1-D_2(\tilde{h}^{(c)};\beta))]$$

where $L_{cat}^H(D_2)$ is an adversarial loss function for the class label discriminator $D_2$; $E_{y_h}[*]$ and $E_{\tilde{h}^{(c)}}[*]$ refer to calculation of an expectation for $*$; $D_2(y_h; \beta)$ indicates a discrimination result of the class label discriminator $D_2$ for a true label $y_h$; $\beta$ is a network parameter of the class label discriminator $D_2$; $D_2(\tilde{h}^{(c)}; \beta)$ indicates a discrimination result of the class label discriminator $D_2$ for $\tilde{h}^{(c)}$ output by the class label predictor; and $L_{cat}^H(\tilde{h}^{(c)})$ is an adversarial loss function for the class label predictor $f_h(\cdot)$.

As a further optimization solution to the image reconstruction method for a cross-modal communication system of the present invention, a learning process of the adversarial image generation module in step 2 includes the following steps:

(4-1) implementing cross-modal image generation by means of a conditional generative adversarial network: specifically, the generative adversarial network includes an image generator G with a network parameter $\eta$ and an image discriminator $D_3$ with a network parameter $\gamma$, and $\tilde{h}^{(f)}$ is inputted to the image generator G to output a corresponding generated image $\tilde{v}=G(\tilde{h}^{(f)}; \eta)$, where $G(*)$ is a function of describing a process of the generator outputting the generated image; $\tilde{v}$ and a true image $v$ are input in combination to the image discriminator $D_3$; and the authenticity of the generated image set $(v, \tilde{v})$ and the true image set $(v, v)$ is discriminated by the image discriminator $D_3$; and (4-2) fitting data distribution by combining a reconstruction loss and an adversarial generation loss function for the generative adversarial network, to finally obtain a loss function for the image generator G as follows:

$$L_G = E[\|v-\tilde{v}\|_2] + L(G, D_3)$$

where $L_G$ is a generation loss of the image generator G and $E[*]$ is an expectation.

As a further optimization solution to the image reconstruction method for a cross-modal communication system of the present invention, in step (4-1), an adversarial generation loss of the generative adversarial network is as follows:

$$L(G, D_3) = -E_v[\log D_3(v, v; \gamma)] - E_{\tilde{v}}[\log(1 - D_3(v, \tilde{v}; \gamma))]$$

where $L(G, D_3)$ is an adversarial loss between the image generator G and the image discriminator $D_3$; $E_v[*]$ and $E_{\tilde{v}}[*]$ refer to calculation of an expectation for $*$; $D_3(v, v; \gamma)$ indicates a discrimination result of the image discriminator $D_3$ for the true image set $(v, v)$; $D_3(v, \tilde{v}; \gamma)$ is a discrimination result of the image discriminator $D_3$ for the generated image set $(v, \tilde{v})$; and $\gamma$ is a network parameter of the image discriminator $D_3$.

As a further optimization solution to the image reconstruction method for a cross-modal communication system of the present invention, a training process of the cross-modal image generation model based on haptic signals in step 3 includes the following steps:

(5-1) acquiring a training set according to step 1:

$$V=\{(v_i, y_i^v), i=1,2,\ldots,N\}, H=\{(h_i, y_i^h), i=1,2,\ldots,N\}$$

where V and H are respectively training data for the image and haptic signals, $v_i$ is the i-th image data, $y_i^v$ is a class label corresponding to $v_i$, $h_i$ is the i-th haptic signal, and $y_i^h$ is a class label corresponding to $h_i$;

(5-2) initializing network parameters $\{\theta_v, \alpha\}$ and $\{\theta_h, \eta, (w,b), \beta, \gamma\}$ of the cross-modal image generation model based on haptic signals, and importing pre-training model parameters of a feature extraction network for the modality data, where the modality data refers to the haptic signal or image data, and the feature extraction network for the haptic signal data refers to the encoder in the cross-modal semantic learning module, and the feature extraction network for the image signal refers to the CNN in the image feature extraction module;

(5-3) minimizing the loss functions by means of stochastic gradient descent, and iteratively training the cross-modal image generation model based on haptic signals till the number of convergences or iterations reaches the specified maximum number, where the maximum number of iterations is preset:

step A. setting the learning rate $\mu_1$ of $D_1$, $D_2$, and $D_3$ and the learning rate $\mu_2$ of G, and setting the number $r$ of iterations to 1;

step B. based on the gradient descent method, updating the network parameters of the modules from a negative gradient direction of the target:

$$\alpha^{r+1} = \alpha^r - \mu_1 \nabla L_{cat}^V(\alpha^r)$$

$$\theta_v^{r+1} = \theta_v^r - \mu_2 \nabla L_{cat}^V(\theta_v^r)$$

$$\beta^{r+1} = \beta^r - \mu_1 \nabla L_{cat}^H(\beta_r)$$

$$\gamma^{r+1} = \gamma^r - \mu_1 \nabla L_G(\gamma^r)$$

$$\theta_h^{r+1} = \theta_h^r - \mu_2 \nabla (L_{cat}^H(\theta_h^r) + L_{cro}(\theta_h^r) + L_G(\theta_h^r))$$

$$(w^{r+1}, b^{r+1}) = (w^r, b^r) - \mu_2 \nabla (L_{cat}^H(w^r, b^r) + L_{cro}(w^r, b^r) + L_G(w^r, b^r))$$

$$\eta^{r+1} = \eta^r - \mu_2 \nabla (L_{cat}^H(\eta^r) + L_{cro}(\eta^r) + L_G(\eta^r))$$

where $L_{cat}^V(*)$ is an adversarial loss of the first-class adversarial network; $L_{cat}^H(*)$ is an adversarial loss of the second-class adversarial network; $L_{cro}(*)$ is an inter-modal loss between the image feature and the haptic feature; and $L_G(*)$ is a loss function of the image generator G; $\theta_v^{r+1}$, $\theta_h^{r+1}$, $(w^{r+1}, b^{r+1})$, $\alpha^{r+1}$, $\beta^{r+1}$, $\gamma^{r+1}$, $\eta^{r+1}$, and $\theta_v^r$, $\theta_h^r$, $(w^r, b^r)$, $\alpha^r$, $\beta^r$, $\gamma^r$, $\eta^r$ are network parameter sets of the class label predictor $f_v(\cdot)$, the class label predictor $f_h(\cdot)$, hidden layer parameters of the attention mechanism-based semantic fusion network, the class label discriminator $D_1$, the class label discriminator $D_2$, the image discriminator $D_3$, and the image generator G after the (r+1)th and rth iterations respectively; the hidden layer parameters include weight and bias; and $\nabla$ is a derivative; and step C. when the number of convergences or iterations reaches the specified maximum number, outputting an optimal adversarial image generation module; otherwise, r=r+1, and repeating step B.

As a further optimization solution to the image reconstruction method for a cross-modal communication system of the present invention, a generation process of the target image in step 4 includes the following steps:

(6-1) a haptic signal $\hat{H}$ received by the receiving end of the cross-modal communication system being:

$$\hat{H} = \{(\hat{h}_k, y_k^{\hat{h}}), k=1, 2, \ldots, M\}$$

where $\hat{h}_k$ and $y_k^{\hat{h}}$ are respectively the kth haptic data and its class label, and M is a total number of target images to be generated;

(6-2) inputting the haptic data in $\hat{H}$ to the encoder to obtain a haptic feature $\hat{h}$; and then, inputting the haptic feature to the trained optimal adversarial image generation module to output a generated target image $\hat{V}$, a specific process being as follows:

$$\hat{V} = G(\hat{h})$$

An image reconstruction device for a cross-modal communication system is provided, which includes:

a model establishing module, configured for acquiring image data and haptic signals, and establishing a cross-modal image generation model based on haptic signals;

a model decomposing module, configured for decomposing the cross-modal image generation model into an image feature extraction module, an attention mechanism-based cross-modal semantic learning module, and an adversarial image generation module, where the image feature extraction module has pre-training parameters $\theta_v$ and $\alpha$, and is used for extracting image features; the attention mechanism-based cross-modal semantic learning module has network parameters $\theta_h$, (w, b) and $\beta$, and is used for conducting pairing and semantic fusion between image features and haptic features; and the adversarial image generation module has network parameters $\eta$ and $\gamma$, and is used for generating a corresponding image signals based on haptic features;

a model training and solving module, configured for solving the cross-modal image generation model based on haptic signals to obtain a result; and adaptively updating model network parameters in the solving process; and a target image obtaining and reconstructing module, configured for acquiring complete haptic signal features, and obtaining the corresponding image signals by using the adversarial image generation module, thus reconstructing the damaged, lost or delayed image signals during transmission.

By adopting the foregoing technical solutions, the present invention achieves the following technical effects as compared with the prior art:

(1) The present invention fulfils a haptic-to-image cross-modal generation task for unpaired data, thus solving the problem of incompleteness caused by image signal delay or packet loss in cross-modal communication, and improving the immersive experience of users.

(2) Such a method can mine the semantic correlation between image and haptic modalities, and construct a cross-modal common subspace, thus bridging the gap among heterogeneous data. Furthermore, this method is designed with an attentive interaction network, such that the generation model can be trained on unpaired heterogeneous data, and the quality and class accuracy of generated images are improved.

DETAILED DESCRIPTION OF THE EMBODIMENTS

In order to make the objectives, technical solutions and advantages of the present invention clearer, the present invention will be described in detail below with reference to the accompanying drawings and specific embodiments.

Figure 2:
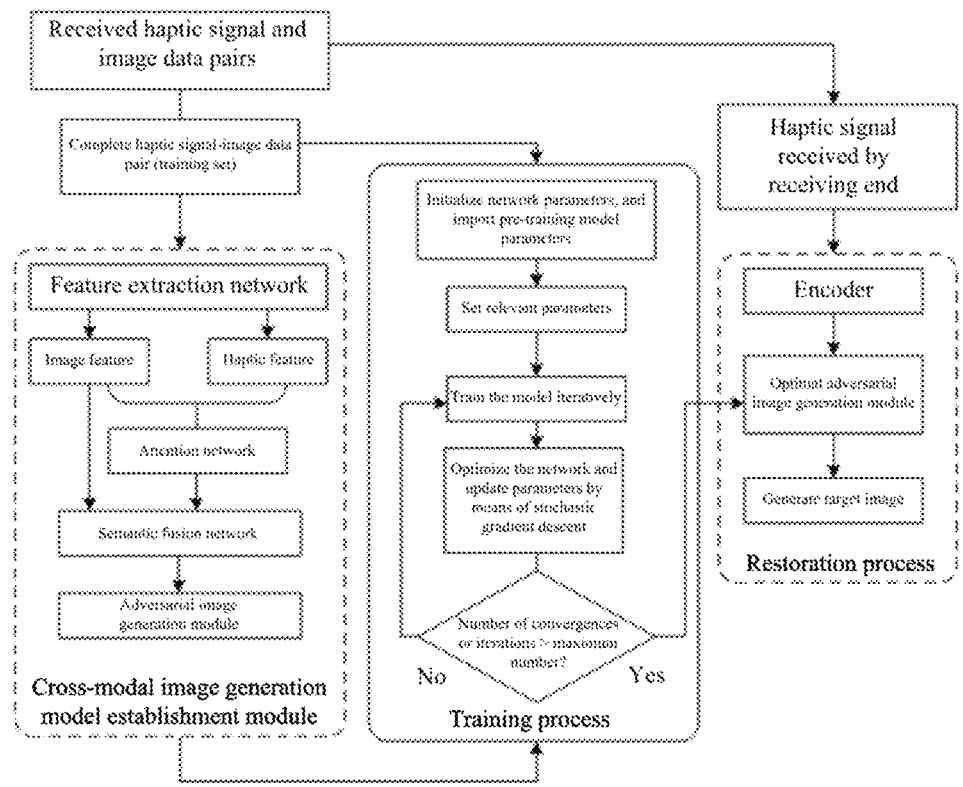
FIG. 2 is a flowchart of specific implementation of the method of the present invention.

Referring to FIG. 2, an image reconstruction method and device for a cross-modal communication system is provided, where the method includes the following steps:

Step 1. Haptic signals and image data pairs received by a receiving end of a cross-modal communication system are selected to serve as a training set, where the image data in each haptic signal and image data pair in the training set has label information about the class it belongs to. The haptic signals and image signals received by the receiving end are processed as haptic data and image data in subsequent steps.

Figure 3:
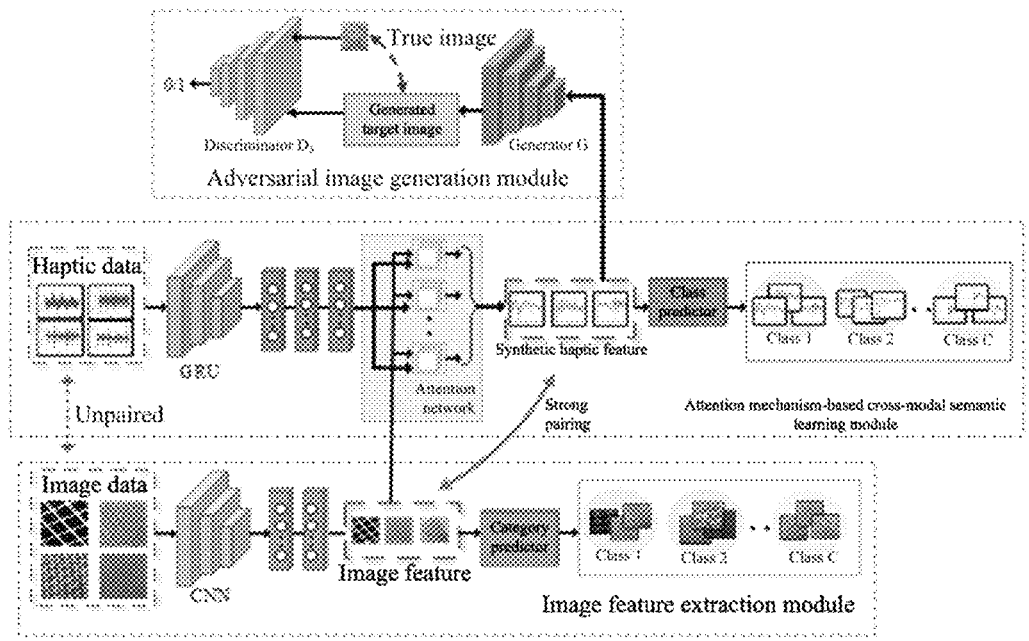
FIG. 3 is a schematic structural diagram of a cross-modal image generation model in an embodiment.

Step 2. A cross-modal image generation model based on haptic signals is established. As shown in FIG. 3, this model includes an image feature extraction module, an attention mechanism-based cross-modal semantic learning module, and an adversarial image generation module.

The image feature extraction module includes a CNN and a first-class adversarial network, and is used for performing feature extraction for the image data in the training set to obtain an image feature.

The cross-modal semantic learning module includes an encoder, an attention mechanism-based semantic fusion network, and a second-class adversarial network. The encoder performs feature extraction for a haptic signal in the training set to obtain the corresponding haptic feature. Then, the haptic feature and the image feature are together input to the attention mechanism-based semantic fusion network. The network performs similarity calculation between each current image feature and the haptic features having the same label as that image feature. Then, a sigmoid function operation is further performed to obtain weight vectors of the haptic features corresponding to the current image feature, and then, weighted summation is performed for the haptic features based on the weight vectors to obtain a synthetic haptic feature most similar to the current image feature. Afterwards, the second-class adversarial network strengthens the synthetic haptic feature under the effect of adversarial learning to maintain class and distribution characteristics of the haptic signal.

The adversarial image generation module includes a generative adversarial network, and is used for outputting a generated image having the same label as the strengthened synthetic haptic feature after receiving the synthetic haptic feature.

Step 3. The cross-modal image generation model based on haptic signals is trained. An intra-modal loss of the image feature is calculated according to the image feature extraction module, an intra-modal loss of the synthetic haptic feature and an inter-modal loss between the synthetic haptic feature and the image feature are calculated according to the attention mechanism-based cross-modal semantic learning module, and an adversarial generation loss of the generated image is calculated according to the adversarial image generation module and by means of mean square error. These calculated losses are used for updating parameters in the cross-modal image generation model. After training converges, an optimal cross-modal image generation model and parameters at this time are saved.

Step 4. After completion of the training, the haptic signal received by the receiving end of the cross-modal communication system is input to the trained cross-modal image generation model to output a target image.

In this embodiment, an implementation process of image feature extraction described in step 3 is as follows:

(1) An image signal V with the size of 128×128 is processed by the CNN to obtain an image feature $v'^{(f)}$. N is a total amount of image signals. The CNN consists of four convolutional and pooling layers, where the numbers of convolution kernels are 512, 256, 128, and 64 respectively, and the size of the convolution kernel is 5×5.

(2) A class label predictor f(·) with a network parameter $\theta_v$ and a discriminator $D_1$ with a network parameter $\alpha$ are constructed for the image feature $v'^{(f)}$, where the predictor consists of two fully connected layers and one softmax layer with the output dimensions of 1024, 128, and 8 respectively, and outputs a predicted class label $v^{(c)}=f(v'^{(f)}; \theta_v)$. The discriminator $D_1$ consists of four fully connected layers with the dimensions of 512, 1024, 512, and 1 respectively; and finally outputs a numeral within the range of (0, 1) that indicates a probability of an input feature being a true feature, so as to discriminate $v^{(c)}$ from a true label y. By means of adversarial training by the predictor and the discriminator $D_1$, the extracted image feature has a class feature. An adversarial loss is as follows:

$$L_{cat}^V(D_1) = -E_y[\log D_1(y)] - E_{v^{(c)}}[\log(1-D_1(v^{(c)}))]$$

$$L_{cat}^V(v^{(c)}) = -E_{v^{(c)}}[\log(1-D_1(v^{(c)}))]$$

In this embodiment, an implementation process of attention mechanism-based cross-modal semantic learning described in step 3 is as follows:

(1) A haptic signal H is processed by the encoder to obtain an initial haptic feature $h^{(f)} = \{h_j^{(f)}, j=1,2, \ldots, N\}$, where N is a total data amount of haptic signals, and the encoder consists of a GRU and two fully connected layers. The GRU has a reset gate and an update gate, where the unit number is set to 256 and the output dimension is 64. The output dimensions of the fully connected layers are 1024 and 64 respectively.

Figure 4:
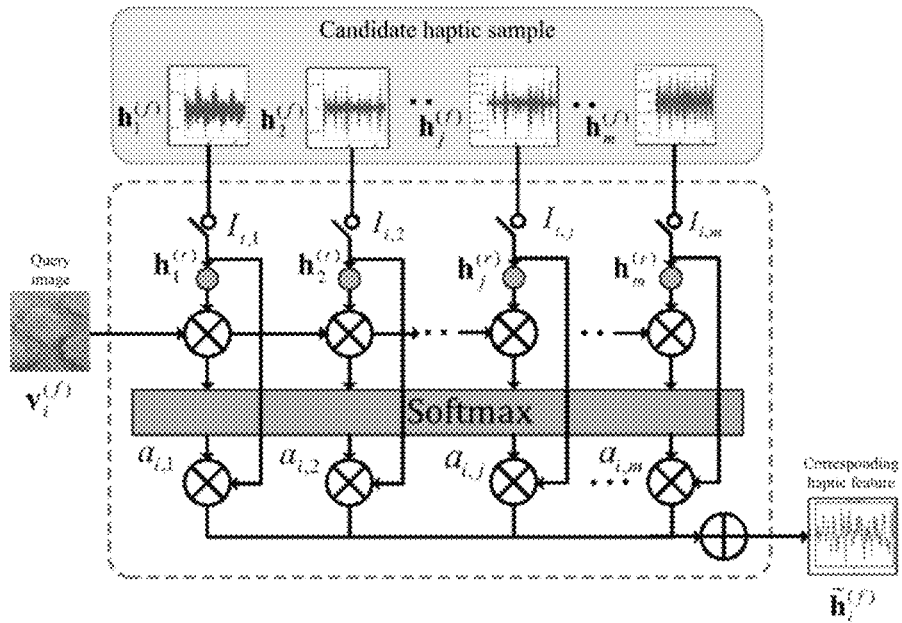
FIG. 4 is a schematic structural diagram of an attention network in an embodiment.

(2) As shown in FIG. 4, the haptic feature and the extracted image feature are matched based on an attentive interaction network. With each $v_i^{(f)}$ as a query vector, a synthetic haptic feature belonging to the same class as the image feature is screened out to form a haptic-image feature pair. The process is specifically as follows:

3-2-1. $v_i^{(f)}$ and the haptic feature $h^{(f)}$ are input to the attention mechanism-based semantic fusion network to output a haptic hidden layer representation vector $h^{(r)} = \{h_j^{(r)}, j=1,2, \ldots, N\}$, where is a hidden layer representation vector of the j-th haptic feature $h_j^{(f)}$, the hidden layer is a single-layer perceptron structure, and an activation function is the Tanh ( ) function. A specific process is as follows:

$$h_j^{(r)} = \text{Tanh}(wh_j^{(f)} + b)$$

where w and b are network parameters of the hidden layer in the attention mechanism-based semantic fusion network.

3-2-2. The Pearson correlation coefficient regarding $h_j^{(r)}$ and $v_i^{(f)}$ is calculated as the similarity:

$$\text{Sim}_{i,j} = I_{i,j} \frac{h_j^{(r)} \cdot v_i^{(f)} - \|h_j^{(r)}\|_1 \cdot \|v_i^{(f)}\|_1}{\sqrt{\|(h_j^{(r)})^2\|_1 - \|h_j^{(r)}\|_1^2} \sqrt{\|(v_i^{(f)})^2\|_1 - \|v_i^{(f)}\|_1^2}}$$

$$I_{i,j} = \begin{cases} 1, & y_{h_j^{(r)}} = y_{v_i^{(f)}} \\ 0, & y_{h_j^{(r)}} \neq y_{v_i^{(f)}} \end{cases}$$

where Sime is the similarity between $v_i^{(f)}$ and $h_j^{(r)}$; $y_{h_j^{(r)}}$ and $y_{v_i^{(f)}}$ are class labels of $h_j^{(r)}$ and $v_i^{(f)}$ respectively; $\|\cdot\|_1$ is the L1 norm; and $I_{i,j}$ is a scoring function and is used for reducing redundant search and calculation for the haptic feature.

Haptic features having the same class label as $v_i^{(f)}$ are selected as candidate haptic features that participate in the calculation of the similarity $\text{Sim}_{i,j}$.

3-2-3. Normalization processing is performed for the similarity Sime by using the softmax( ) function to obtain an attention weight factor $a_{i,j}$; and then weighted summation is performed for the candidate haptic features to obtain a synthetic haptic feature $\tilde{h}_i^{(f)}$ having the same class as $v_i^{(f)}$:

$$a_{i,j} = \text{softmax}(\text{Sim}_{i,j})$$

$$\tilde{h}_i^{(f)} = \sum_{j=1}^{N} a_{i,j} \cdot h_j^{(f)}$$

(3) The image and haptic features are constrained by means of semantic information between paired modalities, where a small distance between paired eigenvectors in different modalities and a large distance between unpaired eigenvectors are required. Specifically, an inter-modal loss objective function is calculated for all the image features and haptic features:

$$L_{cro} = \sum_{i=1}^{N} \|\tilde{h}_i^{(f)} - v_i^{(f)}\|_2^2 + \sum_{i \neq j} \max\left(\delta - \|\tilde{h}_j^{(f)} - v_i^{(f)}\|_2^2, 0\right)^2$$

where $L_{cro}$ is an inter-modal loss between the image feature and the haptic feature; $\tilde{h}_j^{(f)}$ is the j-th synthetic haptic feature unpaired with $v_i^{(f)}$, $\delta$ is a threshold for limiting the difference between $\tilde{h}_j^{(f)}$ and $v_i^{(f)}$; and $\|\cdot\|_2$ is the L2 norm.

(4) A second-class adversarial network is constructed for $\tilde{h}^{(f)}$, where the second-class adversarial network includes a class label predictor $f_h(\cdot)$ with a network parameter $\theta_h$ and a class label discriminator $D_2$ with a network parameter $\beta$. The class label predictor $f_h(\cdot)$ has a plurality of fully connected layers and one softmax layer, where an input is $\tilde{h}^{(f)}$ and an output is a predicted class label $\tilde{h}^{(c)} = f_h(\tilde{h}^{(f)}; \theta_h)$ of $\tilde{h}^{(f)}$; and the output dimensions are 1024, 128, and 8 respectively. The discriminator $D_2$ consists of four fully connected layers with the dimensions of 512, 1024, 512, and 1 respetively, and finally outputs a numeral within the range of (0, 1) that indicates a probability of an input feature being a true feature, so as to discriminate the authenticity of $\tilde{h}_i^{(c)}$ and the true label y. The class label discriminator $D_2$ consists of a plurality of fully connected layers that are sucessively connected, where the last layer has a dimension of 1. $D_2$ is used for discriminating the authenticity of $\tilde{h}^{(c)}$ and the true label $y_h$ corresponding to $\tilde{h}^{(f)}$. By means of adversarial training by the class label predictor $f_h(\cdot)$ and the class label discriminator $D_2$, $\tilde{h}^{(f)}$ is optimized constantly, such that the synthetic haptic feature $\tilde{h}^{(f)}$ finally has a class feature.

An adversarial loss of the second-class adversarial network is as follows:

$$L_{cat}^H(D_2) = -E_{y_h}[\log D_2(y_h; \beta)] - E_{\tilde{h}^{(c)}}[\log(1-D_2(\tilde{h}^{(c)}; \beta))]$$

$$L_{cat}^H(\tilde{h}^{(c)}) = -E_{\tilde{h}^{(c)}}[\log(1-D_2(\tilde{h}^{(c)}; \beta))]$$

where $L_{cat}^H(D_2)$ is an adversarial loss function for the class label discriminator $D_2$; $E_{y_h}[*]$ and $E_{\tilde{h}^{(c)}}[*]$ refer to calculation of an expectation for *; $D_2(y_h; \beta)$ indicates a discrimination result of the class label discriminator $D_2$ for a true label $y_h$; $\beta$ is a network parameter of the class label discriminator $D_2$; $D_2(\tilde{h}^{(c)}; \beta)$ indicates a discrimination result of the class label discriminator $D_2$ for $\tilde{h}^{(c)}$ output by the class label predictor; and $L_{cat}^{H}(\tilde{h}^{(c)})$ is an adversarial loss function for the class label predictor fil( ).

In this embodiment, by minimizing the distance between paired image and haptic modal eigenvectors, the semantic correlation therebetween in a common space can be enhanced, thus solving the problem of inter-modal heterogeneity. By minimizing the distance between the eigenvectors of the same class in the modalities, the class and distribution information of the samples before and after mapping remain consistent.

In this embodiment, an implementation process of adversarial image generation with reference to mean square error in step 3 is as follows:

(1) Cross-modal image generation is implemented by means of a conditional generative adversarial network. Specifically, the synthetic haptic feature $\tilde{h}^{(f)}$ is input to a generator G with a network parameter 11 to output a corresponding generated image $\tilde{v}=G(\tilde{h}^{(f)}; \eta)$; and the generated image and a true image v are input in combination to a discriminator $D_3$ with a network parameter $\gamma$. The image discriminator $D_3$ discriminates the authenticity of the generated image set $(v, \tilde{v})$ and the true image set $(v, v)$. A specific process is as follows:

An adversarial generation loss of the generative adversarial network is as follows:

$$L(G,D_3)=-E_v[\log D_3(v,v;\gamma)]-E_{\tilde{v}}[\log(1-D_3(v,\tilde{v};\gamma))]$$

where $L(G, D_3)$ is an adversarial loss between the image generator G and the image discriminator $D_3$; $E_v[*]$ and $E_{\tilde{v}}[*]$ refer to calculation of an expectation for *; $D_3(v, v; \gamma)$ indicates a discrimination result of the image discriminator $D_3$ for the true image set $(v, v)$; $D_3(v, \tilde{v}; \gamma)$ is a discrimination result of the image discriminator $D_3$ for the generated image set $(v, \tilde{v})$; and $\gamma$ is a network parameter of the image discriminator $D_3$.

In this module, the image generator G includes two fully connected layers and four deconvolutional layers, where the dimensions of the fully connected layers are 128 and 1024 respectively; and the numbers of deconvolutions are 64, 128, 256, and 512, An output is a color image $\tilde{v}$ with the size of 128×128. The image discriminator $D_3$ includes four convolutional layers and two fully connected layers, where the output dimensions of the convolutional layers are 512, 256, 128, and 64 respectively, and the convolution kernel has a size of 5×5; and the dimensions of the fully connected layers are 1024 and 1 respectively. The discriminator finally outputs a numeral within the range of (0,1) that indicates a probability of an input feature being a true feature.

(2) In order to simultaneously conduct global structure-level and pixel-level constraints for the generated image and the true image, a reconstruction loss and an adversarial generation loss function for the generative adversarial network are combined to better fit data distribution. Finally, the loss function of the image generator G is as follows:

$$L_G=E[\|v-\tilde{v}\|_2]+L(G,D_3)$$

where $L_G$ is a generation loss of the image generator G and $E[*]$ is an expectation.

In this embodiment, an implementation process of model training described in step 3 is as follows:

(5-1) A training set is acquired according to step 1:

$$V=\{(v_i,y_i^v),i=1,2,\ldots,N\}, H=\{(h_i,y_i^h),i=1,2,\ldots,N\}$$

where V and H are respectively training data for the image and haptic signals, $v_i$ is the i-th image data, $y_i^v$ is a class label corresponding to $v_i$, $h_i$ is the i-th haptic signal, and $y_i^h$ is a class label corresponding to $h_i$.

(5-2) Network parameters $\{\theta_v, \alpha\}$ and $\{\theta_h, \eta, (w,b), \beta, \gamma\}$ of the cross-modal image generation model based on haptic signals are initialized, and pre-training model parameters of a feature extraction network for the modality data are imported, where the modality data refers to the haptic signal or image signal. The feature extraction network for the modal data refers to the encoder and the CNN in the image feature extraction module.

(5-3) The loss function is minimized by means of stochastic gradient descent, and the cross-modal image generation model based on haptic signals is iteratively trained till the number of convergences or iterations reaches the specified maximum number, where the maximum number of iterations is preset:

Step A. The learning rate $\mu_1$ of $D_1$, $D_2$, and $D_3$ and the learning rate $\mu_2$ of G are set, and the number r of iterations is set to 1.

Step B. Based on the gradient descent method, the network parameters of the modules are updated from a negative gradient direction of the target:

$$\beta^{r+1}=\beta^{r}-\mu_1 \nabla L_{cat}^{H}(\beta_r)$$

$$\gamma^{r+1}=\gamma^{r}-\mu_1 \nabla L_G(\gamma^r)$$

$$\theta_h^{r+1}=\theta_h^{r}-\mu_2 \nabla (L_{cat}^{H}(\theta_h^r)+L_{cro}(\theta_h^r)+L_G(\theta_h^r))$$

$$(w^{r+1},b^{r+1})=(w^r,b^r)-\mu_2 \nabla (L_{cat}^{H}(w^r,b^r)+L_{cro}(w^r,b^r)+L_G(w^r,b^r))$$

$$\eta^{r+1}=\eta^{r}-\mu_2 \nabla (L_{cat}^{H}(\eta^r)+L_{cro}(\eta^r)+L_G(\eta^r))$$

where $L_{cat}^{V}(*)$ is an adversarial loss of the first-class adversarial network; $L_{cat}^{H}(*)$ is an adversarial loss of the second-class adversarial network; $L_{cro}(*)$ is an inter-modal loss between the image feature and the haptic feature; $L_G(*)$ is a loss function of the image generator G; and $\theta_v^{r+1}$, $\theta_h^{r+1}$, $(w^{r+1}, b^{r+1})$, $\alpha^{r+1}$, $\beta^{r+1}$, $\gamma^{r+1}$, $\eta^{r+1}$, and $\theta_v^r$, $\theta_h^r$, $(w^r, b^r)$, $\alpha^r$, $\beta^r$, $\gamma^r$, $\eta^r$ are network parameter sets of the class label predictor $f_v(\cdot)$, the class label predictor $f_h(\cdot)$, hidden layer parameters of the attention mechanism-based semantic fusion network, the class label discriminator $D_1$, the class label discriminator $D_2$, the image discriminator $D_3$, and the image generator G after the (r+1)th and rth iterations respectively. The hidden layer parameters include weight and bias, and $\nabla$ is a derivative.

Step C. When the number of convergences or iterations reaches the specified maximum number, an optimal adversarial image generation module is output; otherwise, r=r+1, and step B is repeated.

In this embodiment, when the received image data is impaired, lost, or delayed in arrival in step 4, a generation process of a target image is as follows:

(6-1) A haptic signal $\hat{H}$ received by the receiving end of the cross-modal communication system is:

$$\hat{H}=\{(\hat{h}_k,y_k^{\hat{h}}),k=1,2,\ldots,M\}$$

where $\hat{h}_k$ and $y_k^{\hat{h}}$ are respectively the kth haptic data and its class label, and M is a total number of target images to be generated.

(6-2) The haptic data in $\hat{H}$ is input to the encoder to obtain a haptic feature $\hat{h}$. Then, the haptic feature is input to the trained optimal adversarial image generation module to output a generated target image $\hat{V}$. A specific process is as follows:

$$\hat{V}=G(\hat{h})$$

The technical solution of the present invention is further described below with reference to a specific embodiment.

(1) Simulation conditions

The present invention performs experimental simulation by using Python software in a windows10 operating system with the CPU being Intel(R)Core(TM) i3-21203.30 GHZ and a memory of 6G.

(2) Simulation Content

A comparison is made between the method of the present invention and the existing cross-modal image generation methods. The methods for comparison are as follows:

Existing method 1: Deep canonically correlated autoencoder (DCCAE), which is initially proposed for deep representation learning from multi-view image data, consists of two autoencoders, and conducts training with typical correlation and reconstruction errors as the constraints.

Existing method 2: Conditional Generative Adversarial Network (CGAN), which can generate images by using haptic signals assisted by class labels.

Existing method 3: Auxiliary Classifier Generative Adversarial Network (ACGAN), which is a conditional image synthesis method with an auxiliary classifier, where an input of the classifier is set to a combination of noise and haptic features.

Existing method 4: Auto Encoding-Generative Adversarial Network (AE-GAN), which combines an autoencoder and an adversarial generative network for image restoration.

(3) Simulation Results

The simulation experiment gives MiroF1, MacroF1, and ACC-SVM indexes corresponding to DCCAE, CGAN, ACGAN, AE-GAN, and the present invention in a single label dataset LMT. A greater index indicates a higher image class accuracy, which is specifically shown in table 1.

TABLE 1

Indexes of haptic generation of images in an LMT dataset

| Comparative method | MiroF1 | MacroF 1 | ACC-SVM |
| --- | --- | --- | --- |
| Existing method 1 | 0.534 | 0.433 | 0.400 |
| Existing method 2 | 0.557 | 0.440 | 0.598 |
| Existing method 3 | 0.560 | 0.451 | 0.625 |
| Existing method 4 | 0.561 | 0.443 | 0.631 |
| Present invention | 0.576 | 0.462 | 0.724 |

Figure 5:
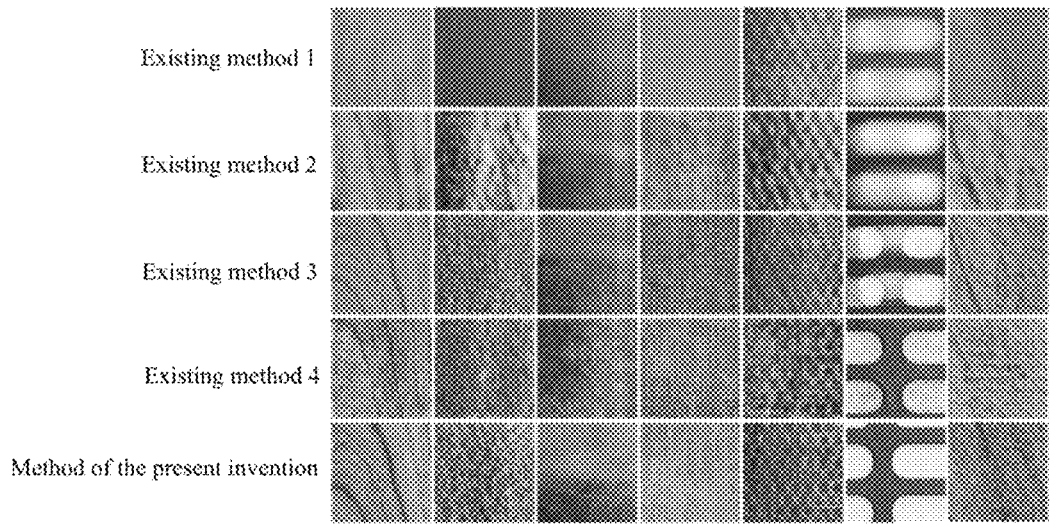
FIG. 5 is a diagram showing the results of validating the image generation performance of models in an embodiment.

It can be seen from the generation results of FIG. 5 and the estimation results of Table 1 that, the image generated by the method of the present invention has the highest class accuracy. This indicates that the model proposed by the present invention is superior to the other models. For the same generated target, the model of the present invention achieves the highest definition in image quality and the highest accuracy in semantics. The importance of a cross-modal pairing network in the model is also verified.

Figure 6:
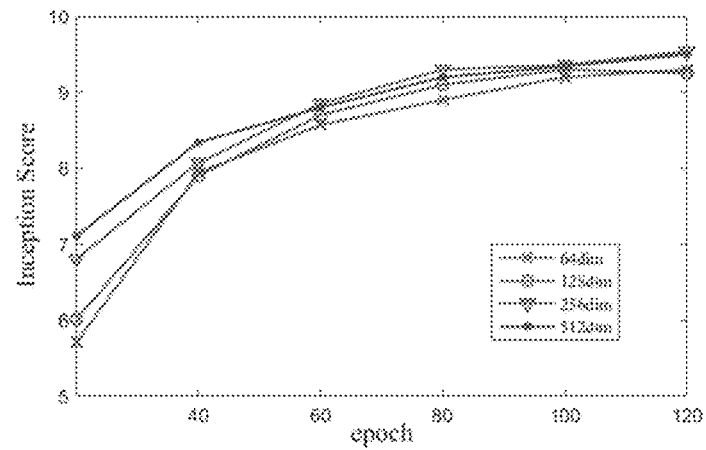
FIG. 6 is a diagram showing the results of validating the convergence performance of models in an embodiment.

In the simulation experiment, IS curves with the cross-modal eigenvector lengths of 64 bits, 128 bits, 256 bits, and 512 bits are drawn to estimate the convergence ability of the cross-modal image generation model, as shown in FIG. 6. The IS curve refers to an inception score indicator, of which the calculation formula is as follows:

$$IS=\exp(E_{v_{gen}}KL(p(y_{gen}|v_{gen})\|p(y_{gen})))$$

where y is a label predicted for an image by a sensing network. A higher divergence of the marginal distribution p(y) and the conditional distribution indicates richer content contained in the image and better image quality.

Figure 1:
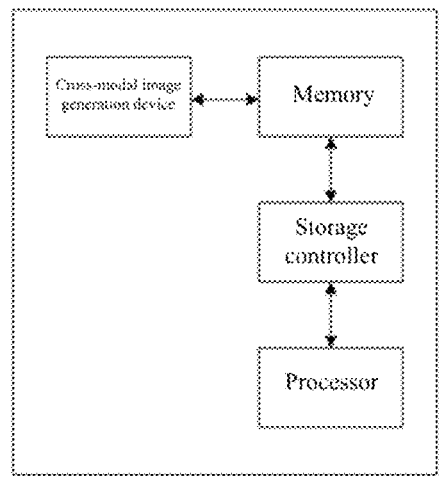
FIG. 1 is a schematic block diagram of an electronic device in an embodiment.

FIG. 1 is a schematic block diagram of an electronic device in an embodiment, and the foregoing method can be loaded to the electronic device provided in FIG. 1.

Briefly, the image reconstruction method for cross-modal communication system disclosed in the present invention is mainly applicable to haptic-to-image generation for large-scale unpaired datasets, and further constructs a cross-modal interaction network with reference to the attention mechanism, thus solving the limitation of the conventional generation model that it can only be trained on paired samples. In other word, this invention not only considers intra-modal similarity of the signals, but also considers inter-modal similarity among image and haptic signals, thereby guaranteeing the accuracy of image generation. Implementation steps of the method are as follows: (1) selecting a cross-modal dataset; (2) setting a model; (3) training the model, including: performing feature extraction for haptic and image signals; constructing an attentive interaction network for haptic features and image features, mapping the haptic features to a cross-modal common subspace, and performing strong pairing of common representations of the modalities according to the class and distribution; performing cross-distribution alignment by using loss functions for inter- and intra-modal similarity while maintaining class consistency between the modalities; constructing an adversarial generative model by means of mean square error; and training the network by means of alternate iteration; and (4) generating an image. By means of a network based on the attention mechanism and according to semantic correlation between different-modality data, the present invention realizes strong pairing and semantic fusion between image and haptic modal data, and enables haptic generation of images with better quality and higher class accuracy, and is applicable to multi-modal services such as 3D games, thus improving the immersive experience of users.

The above merely describes preferred embodiments of the present invention, but the protection scope of the present invention is not limited thereto. All changes or substitutions that can be easily conceived by any person skilled in the art within the technical scope of the present invention fall within the protection scope of the present invention.

What is claimed is:

1. A method of image reconstruction for a cross-modal communication system, comprising the following steps:

step 1. selecting haptic signals and image data pairs received by a receiving end of a cross-modal communication system to serve as a training set, wherein each haptic signal in the training set and each image data of the image data pairs has label information about the class it belongs to;

step 2. establishing a cross-modal image generation model based on haptic signals, the model comprising an image feature extraction module, an attention mechanism-based cross-modal semantic learning module, and an adversarial image generation module, wherein the image feature extraction module comprises a convolutional neural network (CNN) and a first-class adversarial network, and the image feature extraction module is used for performing feature extraction for the image data in the training set to obtain an image feature;

the cross-modal semantic learning module comprises an encoder, an attention mechanism-based semantic fusion network, and a second-class adversarial network, wherein the encoder performs feature extraction for haptic signals in the training set to obtain the corresponding haptic features; then, the haptic features and the image features are together input to the attention mechanism-based semantic fusion network, and the network performs similarity calculation between haptic features having the same label as the image feature and a sigmoid function operation is further performed to obtain weight vectors of the haptic features corresponding to the current image feature, and then, weighted summation is performed for the haptic features based on the weight vectors to obtain a synthetic haptic feature most similar to the current image feature; and afterwards, the second-class adversarial network strengthens the synthetic haptic feature under the effect of adversarial learning to maintain class and distribution characteristics of the haptic signals; and the adversarial image generation module comprises a generative adversarial network, and is used for outputting a generated image having the same label as the strengthened synthetic haptic feature after receiving the synthetic haptic feature;

step 3. training the cross-modal image generation model based on haptic signals, wherein an intra-modal loss of the image feature is calculated according to the image feature extraction module, an intra-modal loss of the synthetic haptic feature and an inter-modal loss between the synthetic haptic feature and the image feature are calculated according to the attention mechanism-based cross-modal semantic learning module, and an adversarial generation loss of the generated image is calculated according to the adversarial image generation module and by means of mean square error; these calculated losses are used for updating parameters in the cross-modal image generation model; and after the training converges, an optimal cross-modal image generation model and parameters at this time are saved; and step 4. after completion of the training, inputting the haptic signal received by the receiving end of the cross-modal communication system to the trained cross-modal image generation model to output a target image.

2. The image reconstruction method for a cross-modal communication system according to claim 1, wherein feature extraction for the image data in step 2 comprises the following steps:

(2-1) subjecting image data V to processing by the CNN to obtain an image feature $v'^{(f)}$, wherein the CNN comprises a plurality of convolutional layers and a pooling layer is connected after each convolutional layer;

(2-2) constructing a first-class adversarial network for $v'^{(f)}$, the first-class adversarial network comprising a class label predictor $f_v(\cdot)$ with a network parameter O and a class label discriminator $D_1$ with a network parameter $\alpha$, wherein $f_v(\cdot)$ consists of a plurality of fully connected layers and one softmax layer, and an input of $f_v(\cdot)$ is the image feature $v'^{(f)}$ and an output of $f_v(\cdot)$ is a predicted class label $v^{(c)}=f_v(v'^{(f)}; \theta_v)$; the class label discriminator $D_1$ consists of a plurality of fully connected layers that are sucessively connected and the dimension of the last layer is 1; and $D_1$ is used for discriminating $v^{(c)}$ and a true label $y_v$ corresponding to the image feature $v'^{(f)}$; and by means of adversarial training by $f_v(\cdot)$ and $D_1$, $v'^{(f)}$ is updated constantly, and an image feature $v^{(f)}=\{v_i^{(f)}, i=1, 2, \ldots, N\}$ that has class characteristic is finally extracted, wherein $v_i^{(f)}$ is an image feature of the i-th image data and N is a total image data amount.

3. The image reconstruction method for a cross-modal communication system according to claim 2, wherein an adversarial loss of the first-class adversarial network is as follows:

$$L_{cat}^V(D_1)=-E_{y_v}[\log D_1(y_v;\alpha)]-E_{v^{(c)}}[\log(1-D_1(v^{(c)};\alpha))]$$

$$L_{cat}^V(v^{(c)})=-E_{v^{(c)}}[\log(1-D_1(v^{(c)};\alpha))]$$

wherein $L_{cat}^V(D_1)$ is an adversarial loss function for the class label discriminator $D_1$; $E_{y_v}[*]$ and $E_{v^{(c)}}[*]$ refer to calculation of an expectation for $*$; $D_1(y_v; \alpha)$ indicates a discrimination result of the class label discriminator for a true label $y_v$; $D_1(v^{(c)}; \alpha)$ indicates a discrimination result of the class label discriminator for $v^{(c)}$ output by the class label predictor; and $L_{cat}^F(v^{(c)})$ an adversarial loss function for the class label predictor $f_v(\cdot)$.

4. The image reconstruction method for a cross-modal communication system according to claim 2, wherein a learning process of the attention mechanism-based cross-modal semantic learning module in step 2 is specifically as follows:

(3-1) subjecting a haptic signal to processing by the encoder to obtain a haptic feature $h^{(f)}=\{h_j^{(f)}, j=1, 2, \ldots, N\}$, wherein $h_j^{(f)}$ is a haptic feature of the j-th haptic signal, N is a total data amount of haptic signals, and the encoder comprises a gated recurrent unit (GRU) and a plurality of fully connected layers;

(3-2) matching, by the attention mechanism-based semantic fusion network, the haptic feature and $v^{(f)}$ extracted in step (2-2), wherein with each $v_i^{(f)}$ as a query vector, a synthetic haptic feature $\tilde{h}_i^{(f)}$ belonging to the same class as $v_i^{(f)}$ is screened out, wherein $\tilde{h}_i^{(f)}$ and $v_i^{(f)}$ form a haptic-image feature pair, and then a synthetic haptic feature corresponding to $v^{(f)}$ is $\tilde{h}^{(f)}=\{\tilde{h}_i^{(f)}, i=1,2, \ldots, N\}$, which is specifically as follows:

3-2-1. inputting $v_i^{(f)}$ and the haptic feature $h^{(f)}$ to the attention mechanism-based semantic fusion network to output a haptic hidden layer representation vector $h^{(r)}=\{h_j^{(r)}, j=1, 2, \ldots, N\}$, wherein $h_j^{(r)}$ is a hidden layer representation vector of the j-th haptic feature $h_j^{(f)}$, the hidden layer is a single-layer perceptron structure, and an activation function is the Tanh ( ) function; and a specific process is as follows:

$$h_j^{(r)}=\text{Tanh}(wh_j^{(f)}+b)$$

wherein w and b are network parameters of the hidden layer in the attention mechanism-based semantic fusion network;

3-2-2. calculating the Pearson correlation coefficient regarding $h_j^{(r)}$ and $v_i^{(f)}$ as the similarity:

$$\text{Sim}_{i,j}=I_{i,j}\frac{h_j^{(r)} \cdot v_i^{(f)} - \|h_j^{(r)}\|_1 \cdot \|v_i^{(f)}\|_1}{\sqrt{\|(h_j^{(r)})^2\|_1 - \|h_j^{(r)}\|_1^2}\sqrt{\|(v_i^{(f)})^2\|_1 - \|v_i^{(f)}\|_1^2}}$$

$$I_{i,j}=\begin{cases}1, & y_{h_j^{(r)}}=y_{v_i^{(f)}} \\ 0, & y_{h_j^{(r)}} \neq y_{v_i^{(f)}}\end{cases}$$

wherein $\text{Sim}_{i,j}$ is the similarity between $v_i^{(f)}$ and $h_j^{(r)}$; $y_{h_j^{(r)}}$ and $y_{v_i^{(f)}}$ are class labels of $h_j^{(r)}$ and $v_i^{(f)}$ respectively; $\|\cdot\|_1$ is the L1 norm; and $I_{i,j}$ is a scoring function and is used for reducing redundant search and calculation for the haptic feature; and selecting haptic features having the same class label as $v_i^{(f)}$ as candidate haptic features that participate in the calculation of the similarity $\text{Sim}_{i,j}$;

3-2-3. performing normalization processing for the similarity $Sim_{i,j}$ by using the softmax( ) function to obtain an attention weight factor $a_{i,j}$; and then performing weighted summation for the candidate haptic features to obtain a synthetic haptic feature $\tilde{h}_i^{(f)}$ having the same class as $v_i^{(f)}$:

$$a_{i,j} = \text{softmax}(Sim_{i,j})$$

$$\tilde{h}_i^{(f)} = \sum_{j=1}^{N} a_{i,j} \cdot h_j^{(f)}$$

(3-3) constraining the image features and the haptic features by means of semantic information between paired modalities: specifically, an inter-modal loss objective function is calculated for all the image features and haptic features:

$$L_{cro} = \sum_{i=1}^{N} \left\| \tilde{h}_i^{(f)} - v_i^{(f)} \right\|_2^2 + \sum_{i \neq j} \max\left(\delta - \left\| \tilde{h}_j^{(f)} - v_i^{(f)} \right\|_2^2, 0\right)^2$$

wherein $L_{cro}$ is an inter-modal loss between the image feature and the haptic feature; $\tilde{h}_j^{(f)}$ is the j-th synthetic haptic feature unpaired with $v_i^{(f)}$, $\delta$ is a threshold for limiting the difference between $\tilde{h}_j^{(f)}$ and $v_i^{(f)}$; and $\|\cdot\|_2$ is the L2 norm;

(3-4) constructing a second-class adversarial network for $\tilde{h}^{(f)}$, wherein the second-class adversarial network comprises a class label predictor $f_h(\cdot)$ with a network parameter $\theta_h$ and a class label discriminator $D_2$ with a network parameter $\beta$; the class label predictor $f_h(\cdot)$ has a plurality of fully connected layers and one softmax layer, and an input is k and an output is a predicted class label $\tilde{h}^{(c)} = f_h(\tilde{h}^{(f)}; \theta_h)$ of $\tilde{h}^{(f)}$; the class label discriminator $D_2$ consists of a plurality of fully connected layers that are sucessively connected and the dimension of the last layer is 1; and $D_2$ is used for discriminating the authenticity of $\tilde{h}^{(c)}$ and the true label $y_h$ corresponding to $\tilde{h}^{(f)}$; and by means of adversarial training by the class label predictor $f_h(\cdot)$ and the class label discriminator $D_2$, $\tilde{h}^{(f)}$ is updated constantly, such that the synthetic haptic feature $\tilde{h}^{(f)}$ finally has a class feature.

5. The image reconstruction method for a cross-modal communication system according to claim 4, wherein an adversarial loss of the second-class adversarial network is as follows:

$$L_{cat}^H(D_2) = -E_{y_k}[\log D_2(y_h; \beta)] - E_{\tilde{h}^{(c)}}[\log(1 - D_2(\tilde{h}^{(c)}; \beta))]$$

$$L_{cat}^H(\tilde{h}^{(c)}) = -E_{\tilde{h}^{(c)}}[\log(1 - D_2(\tilde{h}^{(c)}; \beta))];$$

wherein $L_{cat}^H(D_2)$ is an adversarial loss function for the class label discriminator $D_2$; $E_{y_k}[*]$ and $E_{\tilde{h}^{(c)}}[*]$ refer to calculation of an expectation for *; $D_2(y_h; \beta)$ indicates a discrimination result of the class label discriminator $D_2$ for a true label $y_h$; $\beta$ is a network parameter of the class label discriminator $D_2$; $D_2(\tilde{h}^{(c)}; \beta)$ indicates a discrimination result of the class label discriminator $D_2$ for $\tilde{h}^{(c)}$ output by the class label predictor; and $L_{cat}^H(\tilde{h}^{(c)})$ is an adversarial loss function for the class label predictor $f_h(\cdot)$.

6. The image reconstruction method for a cross-modal communication system according to claim 1, wherein a learning process of the adversarial image generation module in step 2 comprises the following steps:

(4-1) implementing cross-modal image generation by means of a conditional generative adversarial network: specifically, the generative adversarial network comprises an image generator G with a network parameter $\eta$ and an image discriminator $D_3$ with a network parameter $\gamma$, and $\tilde{h}^{(f)}$ is input to the image generator G to output a corresponding generated image $\tilde{v} = G(\tilde{h}^{(f)}; \eta)$, wherein $G(*)$ is a function of describing a process of the generator outputting the generated image; $\tilde{v}$ and a true image v are input in combination to the image discriminator $D_3$; and the authenticity of the generated image set $(v, \tilde{v})$ and the true image set $(v, v)$ is discriminating by the image discriminator $D_3$; and (4-2) fitting data distribution by combining a reconstruction loss and an adversarial generation loss function for the generative adversarial network, to finally obtain a loss function for the image generator G as follows:

$$L_G = E[\|v - \tilde{v}\|_2] + L(G, D_3)$$

wherein $L_G$ is a generation loss of the image generator G and $E[*]$ is an expectation.

7. The image reconstruction method for a cross-modal communication system according to claim 6, wherein in step (4-1), an adversarial generation loss of the generative adversarial network is as follows:

$$L(G, D_3) = -E_v[\log D_3(v, v; \gamma)] - E_{\tilde{v}}[\log(1 - D_3(v, \tilde{v}; \gamma))]$$

wherein $L(G, D_3)$ is an adversarial loss between the image generator G and the image discriminator $D_3$; $E_v[*]$ and $E_{\tilde{v}}[*]$ refer to calculation of an expectation for *; $D_3(v, v; \gamma)$ indicates a discrimination result of the image discriminator $D_3$ for the true image set $(v, v)$; $D_3(v, \tilde{v}; \gamma)$ is a discrimination result of the image discriminator $D_3$ for the generated image set $(v, \tilde{v})$; and $\gamma$ is a network parameter of the image discriminator $D_3$.

8. The image reconstruction method for a cross-modal communication system according to claim 1, wherein a training process of the cross-modal image generation model based on haptic signals in step 3 comprises the following steps:

(5-1) acquiring a training set according to step 1:

$$V = \{(v_i, y_i^v), i = 1, 2, \ldots, N\}, H = \{(h_i, y_i^h), i = 1, 2, \ldots, N\}$$

wherein V and H are respectively training data for the image and haptic signals, $v_i$ is the i-th image data, $y_i^v$ is a class label corresponding to $v_i$, $h_i$ is the i-th haptic signal, and $y_i^h$ is a class label corresponding to $h_i$;

(5-2) initializing network parameters $\{\theta_v, \alpha\}$ and $\{\theta_h, \eta, (w, b), \beta, \gamma\}$ of the cross-modal image generation model based on haptic signals, and importing pre-training model parameters of a feature extraction network for the modality data, wherein the modality data refers to the haptic signal data or image data, and the feature extraction network for the modal data refers to the encoder and the CNN in the image feature extraction module;

(5-3) minimizing the loss function by means of stochastic gradient descent, and iteratively training the cross-modal image generation model based on haptic signals till the number of convergences or iterations reaches the specified maximum number, wherein the maximum number of iterations is preset:

step A. setting the learning rate $\mu_1$ of $D_1$, $D_2$, and $D_3$ and the learning rate $\mu_2$ of G, and setting the number r of iterations to 1;

step B. based on the gradient descent method, updating the network parameters of the modules from a negative gradient direction of the target:

$$\alpha^{r+1}=\alpha^r-\mu_1\nabla L_{cat}^V(\alpha^r)$$

$$\theta_v^{r+1}=\theta_v^r-\mu_2\nabla L_{cat}^V(\theta_v^r)$$

$$\beta^{r+1}=\beta^r-\mu_1\nabla L_{cat}^H(\beta_r)$$

$$\gamma^{r+1}=\gamma^r-\mu_1\nabla L_G(\gamma^r)$$

$$\theta_h^{r+1}=\theta_h^r-\mu_2\nabla(L_{cat}^H(\theta_h^r)+L_{cro}(\theta_h^r)+L_G(\theta_h^r))$$

$$(w^{r+1},b^{r+1})=(w^r,b^r)-\mu_2\nabla(L_{cat}^H(w^r,b^r)+L_{cro}(w^r,b^r)+L_G(w^r,b^r))$$

$$\eta^{r+1}=\eta^r-\mu_2\nabla(L_{cat}^H(\eta^r)+L_{cro}(\eta^r)+L_G(\eta^r))$$

wherein $L_{cat}^V(*)$ is an adversarial loss of the first-class adversarial network; $L_{cat}^H(*)$ is an adversarial loss of the second-class adversarial network; $L_{cro}(*)$ is an inter-modal loss between the image feature and the haptic feature; and $L_G(*)$ is a loss function of the image generator G; $\theta_v^{r+1}$, $\theta_h^{r+1}$, $(w^{r+1}, b^{r+1})$, $\alpha^{r+1}$, $\beta^{r+1}$, $\gamma^{r+1}$, $\eta^{r+1}$, and $\theta_v^r$, $\theta_h^r$, $(w^r, b^r)$, $\alpha^r$, $\beta^r$, $\gamma^r$, $\eta^r$ are network parameter sets of the class label predictor $f_v(\cdot)$, the class label predictor $f_h(\cdot)$, hidden layer parameters of the attention mechanism-based semantic fusion network, the class label discriminator $D_1$, the class label discriminator $D_2$, the image discriminator $D_3$, and the image generator G after the (r+1)th and rth iterations respectively; the hidden layer parameters comprise weight and bias; and $\nabla$ is a derivative; and step C. when the number of convergences or iterations reaches the specified maximum number, outputting an optimal adversarial image generation module; otherwise, r=r+1, and repeating step B.

9. The image reconstruction method for a cross-modal communication system according to claim 1, wherein a generation process of the target image in step 4 comprises the following steps:

(6-1) a haptic signal $\hat{H}$ received by the receiving end of the cross-modal communication system being:

$$\hat{H}=\{(\hat{h}_k,y_k^{\hat{h}}),k=1,2,\ldots,M\}$$

wherein $\hat{h}_k$ and $y_k^{\hat{h}}$ are respectively the kth haptic data and its class label, and M is a total number of target images to be generated;

(6-2) inputting the haptic data in $\hat{H}$ to the encoder to obtain a haptic feature $\hat{h}$; and then, inputting the haptic feature to the trained optimal adversarial image generation module to output a generated target image $\hat{V}$, a specific process being as follows:

$$\hat{V}=G(\hat{h}).$$

10. An image reconstruction device for a cross-modal communication system, comprising:

a model establishing module, configured for acquiring image data and haptic signals, and establishing a cross-modal image generation model based on haptic signals;

a model decomposing module, configured for decomposing the cross-modal image generation model into an image feature extraction module, an attention mechanism-based cross-modal semantic learning module, and an adversarial image generation module, wherein the image feature extraction module has pre-training parameters $\theta_v$ and $\alpha$, and is used for extracting image data features; the attention mechanism-based cross-modal semantic learning module has network parameters $\theta_h$, (w, b) and $\beta$, and is used for conducting pairing and semantic fusion between image features and haptic features; and the adversarial image generation module has network parameters $\eta$ and $\gamma$, and is used for generating a corresponding image based on the haptic features;

a model training and solving module, configured for solving the cross-modal image generation model based on haptic signals to obtain a result, and adaptively updating network parameters of the model in the solving process; and a target image obtaining and reconstructing module, configured for acquiring complete haptic signal features, and obtaining a corresponding image signal by using the adversarial image generation module, thus reconstructing those damaged, lost, or delayed image signals during transmission.

* * * * *